US010309671B2

(12) United States Patent
Nyhof et al.

(10) Patent No.: US 10,309,671 B2
(45) Date of Patent: Jun. 4, 2019

(54) SYSTEMS AND METHODS FOR HEATING AND COOLING A FACILITY

(71) Applicant: Aqua Zone Comfort LLC, Shipshewana, IN (US)

(72) Inventors: David Nyhof, Shipshewana, IN (US); Michael Nyhof, Shipshewana, IN (US); Wayne E. Gulley, Shipshewana, IN (US); Ahmed Ibrahim, Alexandria (EG); Jason Kaminski, Shipshewana, IN (US)

( * ) Notice: Subject to any disclaimer, the term of this patent is extended or adjusted under 35 U.S.C. 154(b) by 0 days.

(21) Appl. No.: 15/205,975

(22) Filed: Jul. 8, 2016

(65) Prior Publication Data

US 2018/0010819 A1    Jan. 11, 2018

(51) Int. Cl.

| F24F 11/86 | (2018.01) |
|---|---|
| F24F 11/30 | (2018.01) |
| F24F 13/28 | (2006.01) |
| F24F 1/0003 | (2019.01) |
| G05B 15/02 | (2006.01) |
| F24F 11/63 | (2018.01) |
| F24F 11/52 | (2018.01) |
| F24F 11/58 | (2018.01) |
| F24F 110/20 | (2018.01) |
| F24F 110/10 | (2018.01) |

(52) U.S. Cl.
CPC .......... *F24F 11/30* (2018.01); *F24F 1/0003* (2013.01); *F24F 13/28* (2013.01); *G05B 15/02* (2013.01); *F24F 11/52* (2018.01); *F24F 11/58* (2018.01); *F24F 11/63* (2018.01); *F24F 2110/10* (2018.01); *F24F 2110/20* (2018.01); *F24F 2221/26* (2013.01); *G05B 2219/2642* (2013.01)

(58) Field of Classification Search
CPC .................................................. F24F 11/0086
See application file for complete search history.

(56) References Cited

U.S. PATENT DOCUMENTS

| 4,584,987 A | 4/1986 | Rotili |
|---|---|---|
| 4,779,795 A | 10/1988 | Winmill |

(Continued)

FOREIGN PATENT DOCUMENTS

| CN | 2929525 Y | * | 8/2007 | ............... F24C 7/00 |
|---|---|---|---|---|
| JP | 11223345 A | * | 8/1999 | |
| WO | WO2013011226 A2 | | 1/2013 | |

OTHER PUBLICATIONS

Sato et al., Translation of JP 11223345A. 1999.*

*Primary Examiner* — Tejal Gami
(74) *Attorney, Agent, or Firm* — Tran & Associates

(57) ABSTRACT

Improved systems for heating and cooling a space may include a heating and cooling unit for providing heating and cooling functions mounted inside a housing assembly and a display unit mounted to the housing assembly. A control unit may be coupled to the heating and cooling unit and the display unit. The control unit may be operative to cause an image or video associated with heat be displayed on the display unit when the heating and cooling unit is in the heating mode of operation and to cause an image or video associated with coolness be displayed on the display unit when the heating and cooling unit is in the cooling mode of operation. The control unit may be coupled to a server that enables remotes operation of the system via a client application. Other implementations also may be provided.

15 Claims, 9 Drawing Sheets

(56) References Cited

U.S. PATENT DOCUMENTS

| | | | |
|---|---|---|---|
| 2005/0199233 A1 | 9/2005 | Butler et al. | |
| 2006/0041655 A1* | 2/2006 | Holloway | G06F 1/18 709/223 |
| 2008/0216366 A1* | 9/2008 | Purton | G09F 19/12 40/428 |
| 2009/0140059 A1* | 6/2009 | Barton | G05D 23/1905 236/51 |
| 2010/0237156 A1 | 9/2010 | Minogue | |
| 2013/0233841 A1* | 9/2013 | Gallo | H05B 1/00 219/201 |
| 2014/0318529 A1* | 10/2014 | Nielsen | F24B 1/198 126/544 |
| 2017/0276395 A1* | 9/2017 | Nyhof | F24F 13/20 |

* cited by examiner

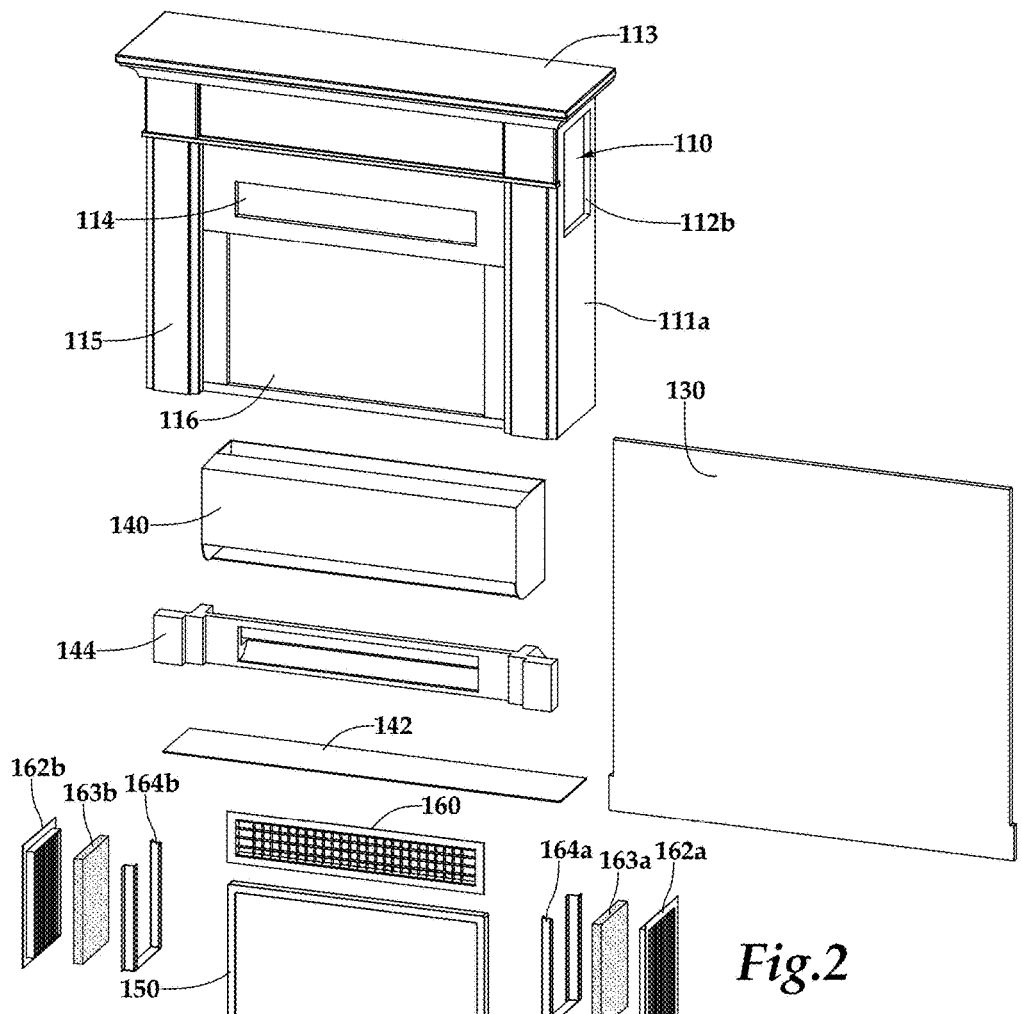
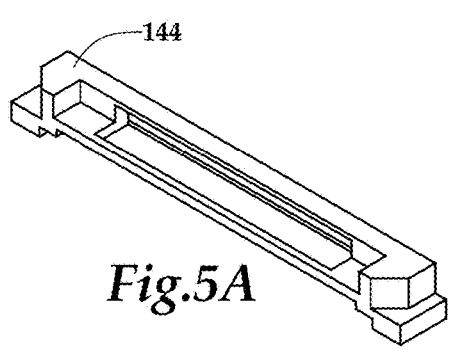
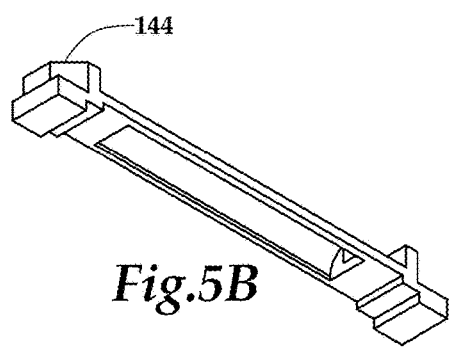
Fig.2
Fig.5A   Fig.5B

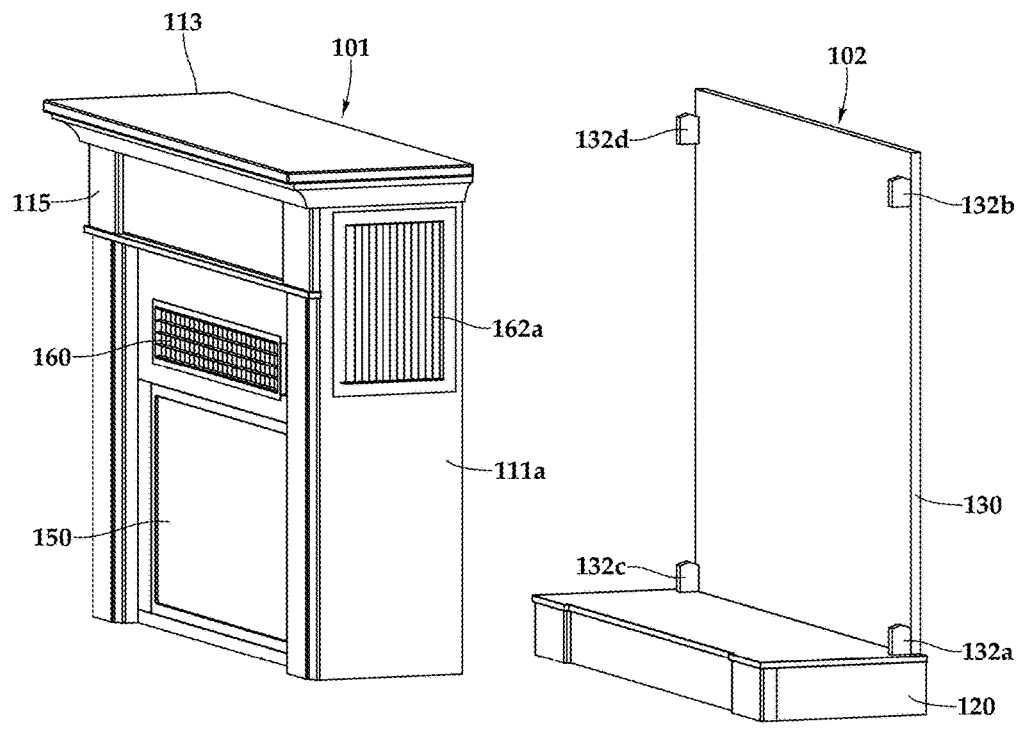
*Fig.4A*
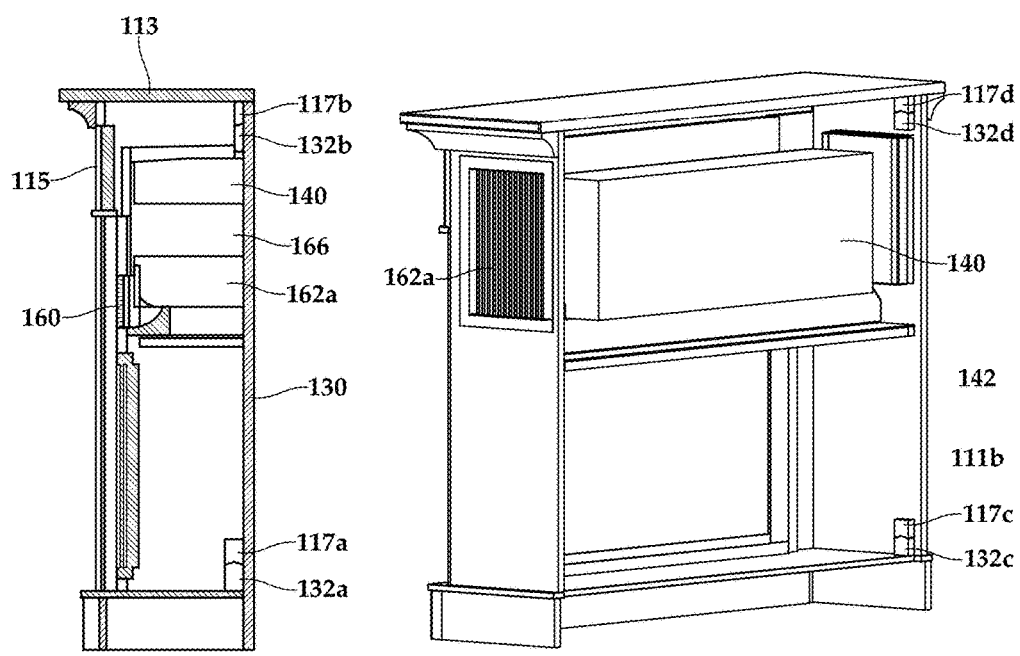
*Fig.3*  *Fig.4B*

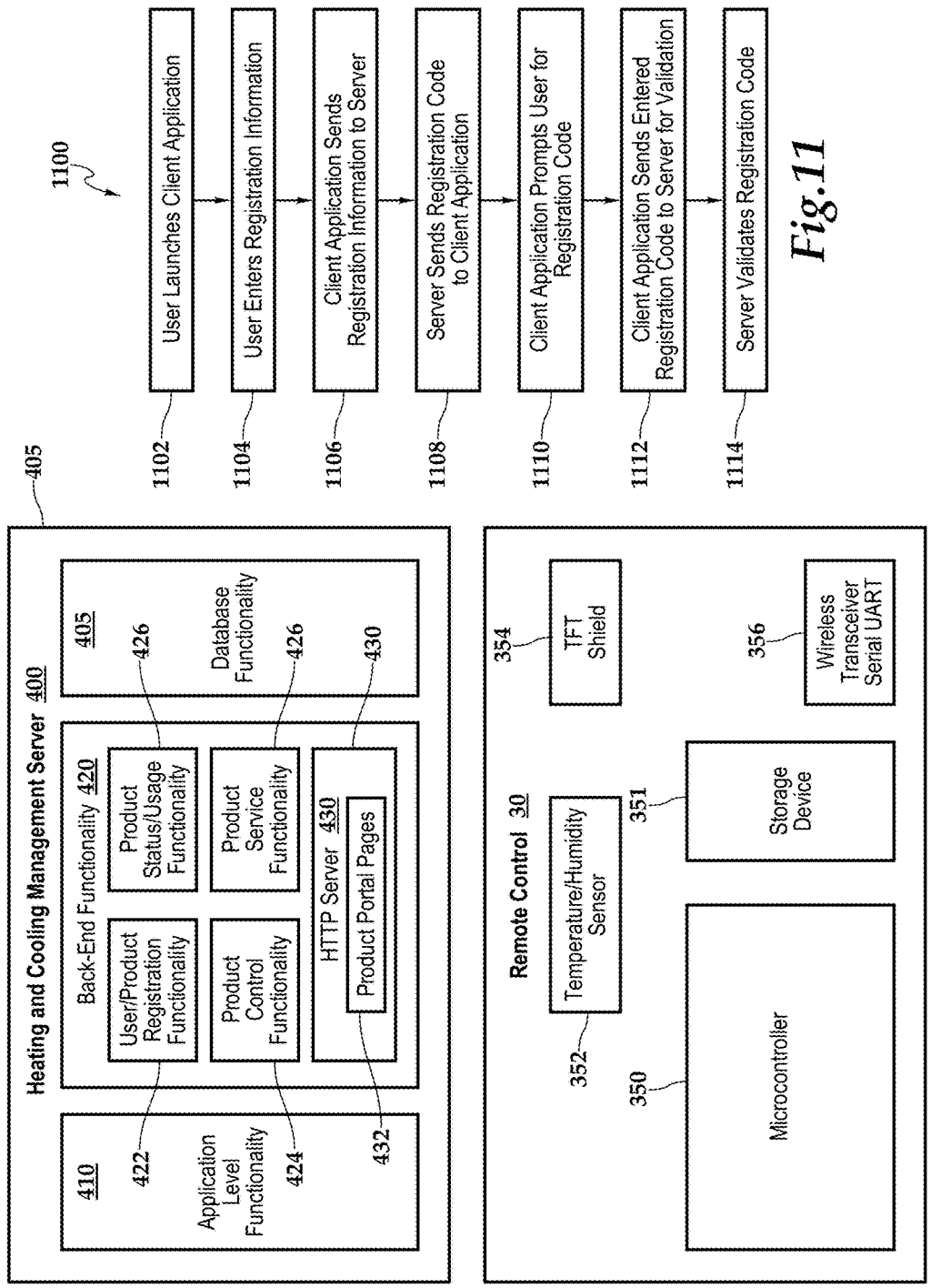

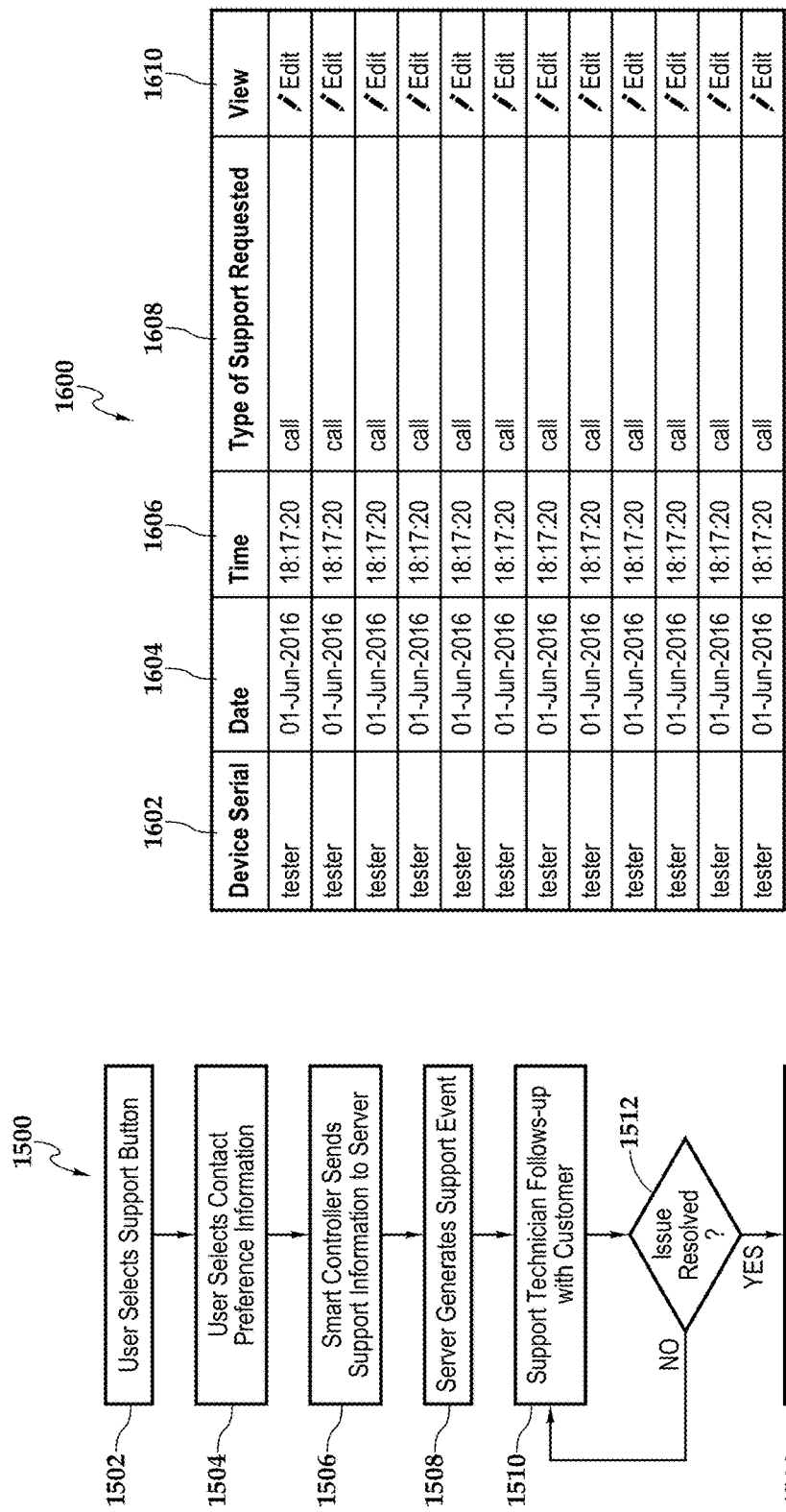

SYSTEMS AND METHODS FOR HEATING AND COOLING A FACILITY

BACKGROUND OF THE INVENTION

1. Technical Field

The present application relates to systems and methods for heating and cooling a facility, and more particularly, to systems and methods for providing a free-standing units that provide ambiance while heating and cooling a facility.

2. Related Art

Ever since man discovered and learned to control fire hundreds of thousands of years ago, he has used it to heat his home. While fire is great for instantly heating a location, it also is inefficient and dangerous. Wood burning fireplaces are difficult and expense to install, requiring extensive venting and/or a chimney. They also can cause carbon monoxide poisoning and possibly lead to a fire that decimates or completely destroys the facility. Similarly, propane burners also are costly to install and are inefficient and difficult to regulate.

To overcome some of these problems, central air conditioning and heating systems where developed. While these types of systems offer whole-house or large-commercial-space cooling, they also are expensive to install and inefficient. In a typical system, a heat-exchanger is typically placed inside the central furnace/AC unit of the forced air heating system. Central air and heating systems require extensive ductwork that must be run through the facility to direct air to the target areas. These ducts are not only expensive, they also are inefficient; it is estimated that about 27% of every dollar spent on heating or cooling air is lost in the ductwork.

Accordingly, a need has long existed for improved systems and methods for heating and cooling a space.

SUMMARY

Improved systems for heating and cooling a space may include a heating and cooling unit for providing heating and cooling functions mounted inside a housing assembly and a display unit mounted to the housing assembly. A control unit may be coupled to the heating and cooling unit and the display unit. The control unit may be operative to cause an image or video associated with heat be displayed on the display unit when the heating and cooling unit is in the heating mode of operation and to cause an image or video associated with coolness be displayed on the display unit when the heating and cooling unit is in the cooling mode of operation. The control unit may be coupled to a server that enables remotes operation of the system via a client application.

Other systems, methods, features, and technical advantages of the invention will be, or will become apparent to one with skill in the art upon examination of the following figures and detailed description. It is intended that all such additional systems, methods, features, and technical advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention.

FIG. 2 shows an exploded view of the exemplary free-standing heating and cooling system of FIG. 1;

FIG. 3 shows side cutaway view of the exemplary free-standing heating and cooling system of FIG. 1;

FIG. 4a shows a perspective view of an exemplary free-standing heating and cooling system in a first assembly position;

FIG. 4b shows a perspective view of an exemplary free-standing heating and cooling system in an assembled positon with the back panel removed;

FIG. 5a shows a perspective view of a duct for use in the exemplary free-standing heating and cooling system of FIG. 1;

FIG. 5b shows another perspective view of a duct for use in the exemplary free-standing heating and cooling system of FIG. 1;

FIG. 10 shows an exemplary logical architecture for a server for use with the exemplary free-standing heating and cooling system of FIG. 1;

FIG. 11 shows an exemplary flow chart for a product registrations process for the exemplary free-standing heating and cooling system of FIG. 1;

FIG. 13 shows an exemplary physical architecture for an exemplary remote control unit for use in the exemplary free-standing heating and cooling system of FIG. 1;

FIG. 15 shows an exemplary flow chart for a process for requesting product support for the exemplary free-standing heating and cooling system of FIG. 1;

FIG. 16 shows an exemplary screen shot of a list of product support tickets for exemplary free-standing heating and cooling system of FIG. 1.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting.

Free-Standing Heating and Cooling System Overview

Figure 1:
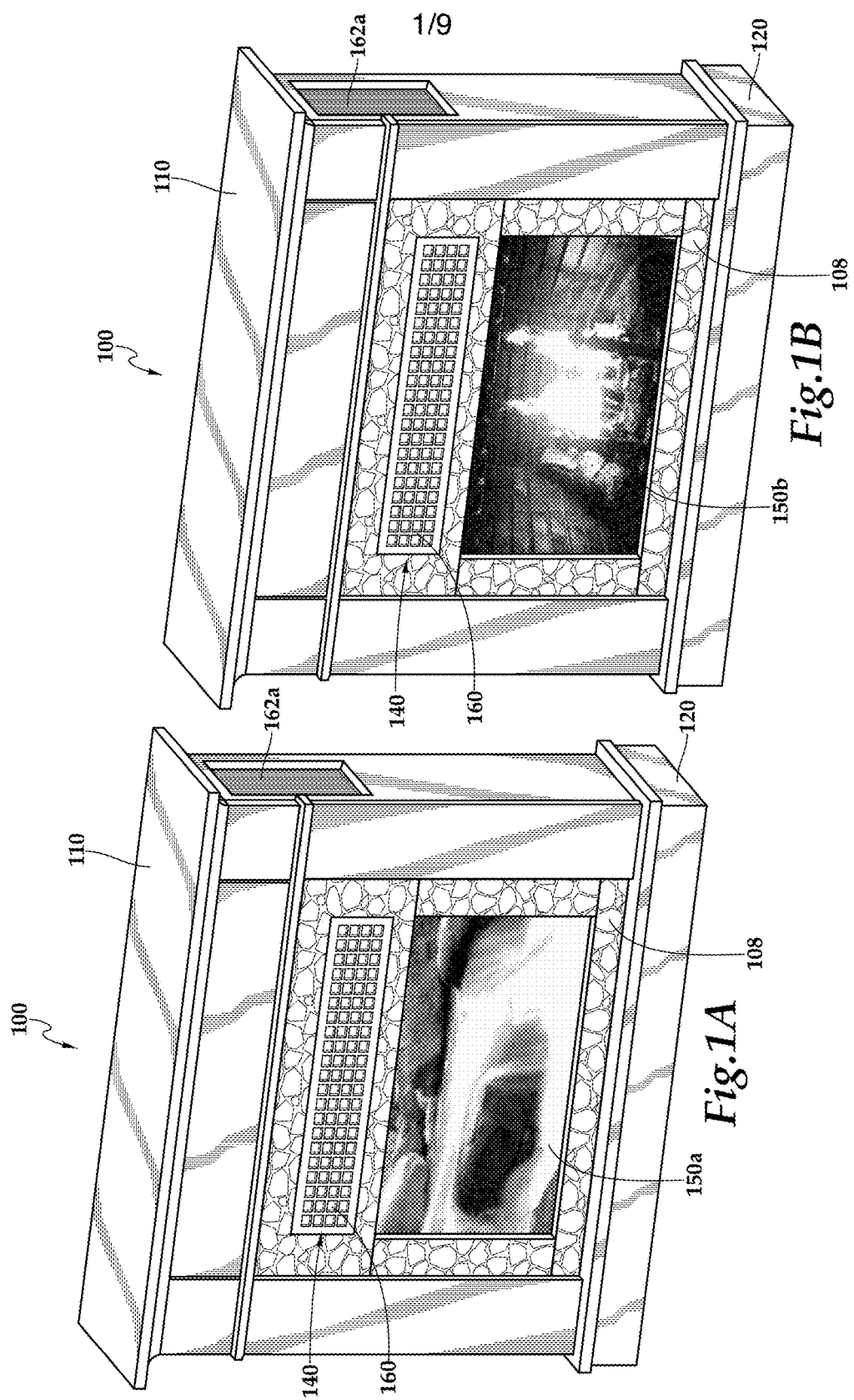
FIGS. 1a and 1b (collectively "FIG. 1") show a perspective view of an exemplary a free-standing heating and cooling system.

Referring initially to FIGS. 1a-b and 2, perspective and exploded views of an exemplary a free-standing heating and cooling system 100 is shown. Only relevant portions of the system 100 are shown; other portions are well known to those skilled in the art and are not discussed herein for sake of clarity. The system 100 may include a housing assembly 110, a heating and cooling unit 140, a display unit 150 and a control unit 200. The heating and cooling unit 140 may be mounted either partially or completely inside the housing assembly 110 and the display unit 150 may be mounted either internally or externally on the housing assembly 110. The heating and cooling unit 140 may function to heat and/or cool a space or facility.

The control unit 200 may be coupled to, be in communication with and/or direct the operation of the heating and cooling unit 140. The control unit 200 also may be coupled to, be in communication with and direct the operation of the display unit 150. For example, the control unit 200 may cause the display unit 150 to show images and/or play audio corresponding to a detected mode of operation of the heating and cooling unit, such as an audio-visual representation of a fire or similar image associated with heat when the heating and cooling unit 140 is operating in a heating mode of operation (as shown in FIG. 1B) or an audio-visual representation of a waterfall or other images/video associated with coolness or cold when the heating and cooling unit 140 is operating in a cooling mode of operation (as shown in FIG. 1A). For example, images and/or video that are associated with heat may include images and/or video of a fire, the sun, lava, volcanos, steam, thermometers and the like. Similarly, images and/or video that are associated with coolness may include images and/or video of water, ice, snow, thermometers and the like. Other images also may be used to convey imagery associated with the heating and/or cooling mode of operation.

The images and/or video may be stored and retrieved from memory such flash drives coupled to the control unit 200 and/or display unit 150, streamed from the Internet through the control unit 200 and/or display unit 150, from any electronic device (such as a DVD/CD player, gaming console, tablet, smart phones, and the like) that may be connected to the control unit 200 and/or display unit 150 through the input/output panel 250, and the like.

Exemplary Housing Assemblies

Referring to FIG. 2, an exploded view of the exemplary free-standing heating and cooling system of FIGS. 1a-b. The housing assembly 110 may include a top portion 113, two side portions 111a and 111b, a front portion 115, a base portion 120 and a back portion 130. In some embodiments, the top portion 113, side portions 111a and 111b and front portion 115 may be pre-assembled as a single unit 101 and the base portion 120 and back portion 130 may be pre-assembled as a second unit 102 for ease of installation, as described below in connection with FIGS. 4a and 4b.

The assembly 110 also may include a mounting shelf 142 upon which the heating and cooling unit 140 may be mounted by brackets, screws and the like. Other mounting methods also may be used. The mounting shelf 142 may be coupled to any or all of the front portion 115, the back portion 130, and the side portions 111a-b. In some embodiments, the mounting shelf 142 and heating and cooling unit 140 may be assembled in a configuration that provides clearance between the side portions 111a-b and the heating and cooling unit 140 of between about 2 inches and about 12 inches, preferably between about 3 inches and about 10 inches, even more preferably between about 5 inches and about 7 inches and in some embodiments about 6 inches. Similarly, in some embodiments, the mounting shelf 142 and heating and cooling unit 140 may be assembled in a configuration that provides clearance between the top portion 113 and the heating and cooling unit 140 of between about 2 inches and about 12 inches, preferably between about 2 inches and about 8 inches, even more preferably between about 3 inches and about 6 inches and in some embodiments about 4 inches.

The front portion 115 may include an aperture 114 in which a front vent 160 may be mounted. Duct 144 may be coupled to the heating and cooling unit 140 to direct airflow from the heating and cooling unit 140 through the front vent 160. Duct 144 is shown in greater detail in FIGS. 5a-b. Similarly, side portions 111a-b may include apertures 112a-b for receiving filter bracket or jamb 164a-b that may hold air filters 163a-b and to which side vents 162a-b may be coupled. In some embodiments, side vents 162a-b may be pivotably coupled to the jambs 164a-b.

In some embodiments, the housing assembly 110 may include a decorative façade 108. The decorative façade 108 may provide improved aesthetics for the system 100. For example, in the embodiment illustrated in FIG. 1a-b, the housing assembly 110 and decorative façade 108 provide the appearance of a fireplace, such as stone and wood fireplace. Exemplary decorative facades 108 may include stones, bricks, tiles, glass, wood, marble, copper and the like. In some embodiments, the façade 108 may be removably attached to the housing assembly 110 such as, for example, by wood screws. In this manner, various facades 108 may be interchangeable to allow a user to change the appearance of the assembly 110 as desired. In various embodiments, the housing assembly 110 and/or façade 108 may provide the appearance and/or functionality of an armoire, dresser, bookcase, entertainment center and the like.

When assembled, exemplary housings 110 may be between about 30 inches and about 96 feet tall, preferably between about 36 inches and about 75 inches tall, even more preferably between about 40 inches and about 60 inches tall, and in some embodiments about 54 inches tall. Exemplary assembled housings 110 may be between about 30 inches and about 96 feet wide, preferably between about 36 inches and about 75 inches wide, even more preferably between about 40 inches and about 60 inches wide, and in some embodiments about 54 inches wide. Exemplary assembled housings 110 may be between about 9 inches and about 36 feet deep, preferably between about 10 inches and about 24 inches deep, even more preferably between about 11 inches and about 18 inches deep, and in some embodiments about 14 inches deep. For example, in various embodiments, the housing assembly 110 may be about 30 inches tall by about 30 inches wide by about 9 inches deep, about 40 inches tall by about 40 inches wide by about 11 inches deep, and about 54 inches tall by about 54 inches wide by about 14 inches deep. Other dimensions may be used.

The various components of the housing assembly 110 may be made of any suitable material, such as wood, metal, stone, brick, laminate, foam, plastic or the like. Other materials also may be used. In some embodiments, each component is made of the same material. Alternatively or additionally, one or more of the components of the housing assembly 110 may be made of different material than others of the components. Other materials also may be used.

In some embodiments, front vent 160 is made of plastic and duct 144 is made of foam to avoid condensation that may result when metal is used. Filters 163*a*-*b* may be made of any type of filter material. In some embodiments, filters 163*a*-*b* may comprise dual-ply Dustlok® Media provided by Fiberbond of Michigan City, Ind. Other materials also may be used.

Exemplary Assembling of the Housing Assembly 110

Referring to FIGS. 4*a*-*b*, perspective views of an exemplary free-standing heating and cooling system 100 are shown in a first assembly position (FIG. 4*a*) and in an assembled positon with the back panel removed for visibility (FIG. 4*b*). In the illustrated embodiment, In some embodiments, the top portion 113, side portions 111*a* and 111*b* and front portion 115 may be pre-assembled as a first unit 101 and the base portion 120 and back portion 130 may be pre-assembled as a second unit 102. The housing assembly 110 may include complimentary sets of mounting members 117*a*-*d* and 132*a*-*d* (also shown in FIG. 3) may be provided on the first unit 101 and second unit 102, respectively, to couple the first unit and the second unit. The mounting members may include complimentary shapes that engage one another for ease of alignment and installation. For example, in the embodiment shown in FIGS. 3 and 4*a*-*b*, mounting members 132*a*-*d* include a wedge-shaped upper portion that the wedge-shaped cavity of the lower portion of mounting members 117*a*-*d* may engage. As a result, the first unit 101 and second unit 102 may be easily assembled or disassembled as needed. Alternatively, or additionally, mounting members 117*a*-*d* and 132*a*-*d* may use other complimentary shapes, such as curves, teeth and the like.

Exemplary Heating and Cooling Units

The heating and cooling unit 140 may be any type of system that may provide both heating and cooling functionality. Exemplary heating and cooling units 140 may provide heating and cooling at ranges between about 9000 British Thermal Units (BTUs) and about 24,0000 BTU or more. In some embodiments, the heating and cooling unit 140 may be a mini-split unit. A mini-split unit generally refers to a heating and cooling device having a DC compressor installed on the exterior of a building that may allow either heating or cooling of air and may be used in conjunction with a unit on the interior of the building. Exemplary heating and cooling units 140 include mini split units such as the 9,000 btu CS-25V1A-MB150DC, 12,000 btu CS-35V1A-PB150DC and 18,000 btu CS-53V2A-WB150D all provided by Guangdong CHIGO Air-Conditioning Co, LTD., of Foshan, Guangdong, China.

Exemplary Display Units 150

In some embodiments, the display unit may be a television, such as a smart TV having a wired or wireless network interface. In some embodiments, the display unit 150 may include an integrated speaker for playing audio signals. Alternatively, or additionally, the system 100 may include speakers and/or other audio equipment external to the display unit 150. In operation, the display unit 150, under direction from the control unit 200, may show images and/or play audio corresponding to a mode of operation of the heating and cooling unit 140, such as images and audio of a fire when the system 100 is in a heating mode or images and audio of a waterfall when the system 100 is in a cooling mode of operation.

The display unit 150 may be coupled to an external side of the front portion 115, such as at a mounting position 116. The display unit 150 may be mounted in a variety of ways, such as via a standard television wall mount bracket. In some embodiments, the display unit may be movably mounted to the assembly 110, such as pivotably mounted to the assembly 110 or may be outwardly extendable from the assembly 110. Other mounting configurations may be used.

Exemplary Control Units 200

Figure 6:
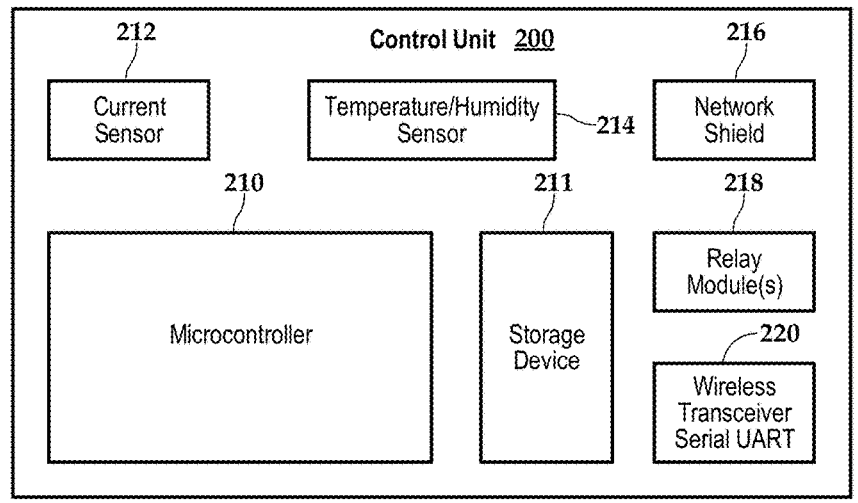
FIG. 6 shows an exemplary physical architecture for an exemplary control unit for use in the exemplary free-standing heating and cooling system of FIG. 1.

Referring to FIG. 6, an exemplary physical architecture for an exemplary control unit for use in the exemplary free-standing heating and cooling system 100 is shown. Although selected aspects, features, or components of the implementations are depicted as being stored in memories, all or part of systems and methods consistent with the disclosed architecture may be stored on, distributed across, or read from other machine-readable media, for example, secondary storage devices such as hard disks, floppy disks, and CD-ROMs; a signal received from a network; other forms of ROM or RAM either currently known or later developed; and the like.

Furthermore, although specific components of the control unit 200 architecture will be described, methods, systems, and articles of manufacture consistent with disclosed architecture may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways, including unstructured data. Programs may be parts of a single program, separate programs, or distributed across several memories and processors. Systems may be implemented in hardware, software, or a combination of hardware and software in one processing system or distributed across multiple processing systems. For example, various functionalities of the control unit 200 may be integrated into the heating and cooling unit 140, the display unit 150, or both.

In the illustrated embodiment, the control unit 200 may include a microcontroller 210 coupled to a current sensor 212, temperature sensor 214, network shield 216, one or more relay modules 218 and a wireless transceiver serial UART 220. Optionally, additional non-transient memory 211, such as flash memory and the like, may be provided. The control unit 200 also may include other components.

The microcontroller 210 may provide processing capabilities and/or transient and/or non-transient memory for enabling the functionalities of the control unit 200 as described herein. In some embodiments, microcontroller 210 may be an ARDUINO board or module provided by Arduino LLC, such as the ARDUINO UNO or ARDUINO MEGA. Other microcontrollers, such as the RASBERRY PI microcontroller provided by the Raspberry Pi Foundation of Cambridge, England, also may be used.

The current sensor 212 may monitor measure any change in the amount of current running to various components of the system 100, such as to detect whether a component is in a powered-on or powered-off state. In some embodiments, this signal may be used as an input signal to a relay to, for example, the heating and cooling unit 140 to turn the unit 140 on off. The temperature/humidity sensor 214 may monitor the current temperature and/or humidity of the room in which the heating and cooling system 100 is placed. An exemplary temperature/humidity sensor is the ARDUINO DHT22/AM2302 provided by Arduino LLC.

The network shield 216 may provide networking functionality to the control unit 200. For example, the network shield 216 may add wired networking functionalities (such as Ethernet functionality), wireless networking functionalities (such as wireless networking functionalities in accordance with the IEEE 802.11 standards), or both. For example, in some embodiments, the network shield 216 may be an ARDUINO W5100 Ethernet shield and ARDUNIO W5100 Expansion Board for ARDUINO MEGA2560, all provided by Arduino LLC.

The relay modules 218 may provide wired control of other elements of the system, such as the display unit 150 and the heating and cooling unit 140. The relay modules may be electronic switches that, for example, turn on and off the display unit 150. In some embodiments, the relay modules 218 may comprise an ARDUINO four (4) channel relay module and ARDUINO 5-volt four (4) Channel Relay Module Controller For Arduino Mega256, all provided by Arduino LLC.

The wireless transceiver serial UART 220 may enable communication between the control unit and the heating and cooling unit 140, the display unit 150, and/or the remote control 30. The communication may be unilateral or bi-lateral. For example, the remote control 30 may communicate command signals to the control unit 200 via the wireless transceiver 220, and the control unit 200 may, in turn, communicate commands to the heating and cooling unit 140 to, for example, turn on or off. In some embodiments, the relay modules 218 may comprise a C1101 wireless transceiver provided by Arduino LLC.

Exemplary Power Circuits

Figure 7A:
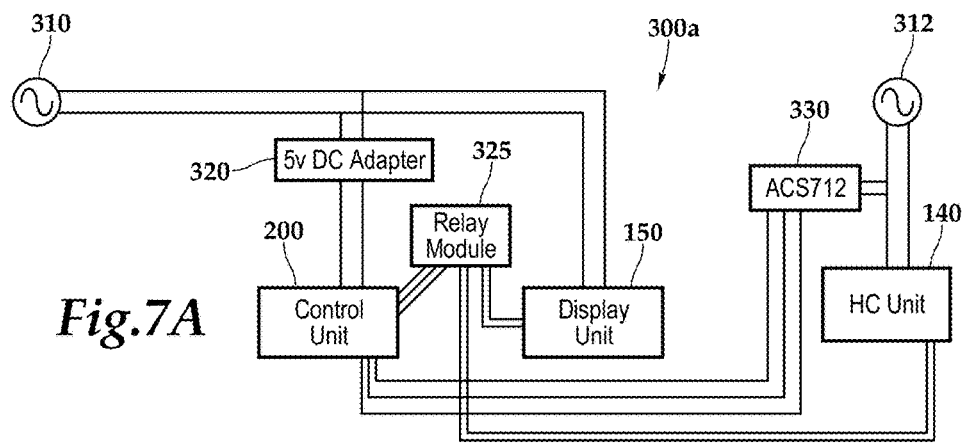
FIG. 7a shows an exemplary power circuit for use with a 110 AC power supply and the exemplary free-standing heating and cooling system of FIG. 1.
Figure 7B:
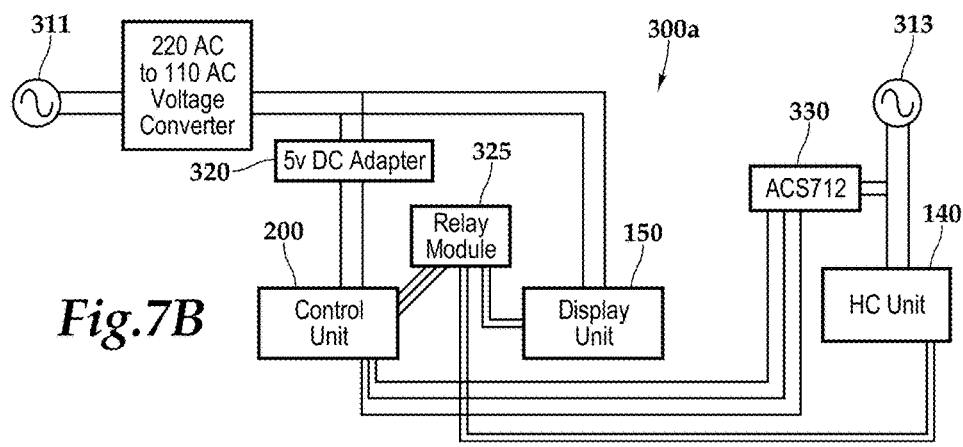
FIG. 7b shows an exemplary power circuit for use with a 220 AC power supply and the exemplary free-standing heating and cooling system of FIG. 1.

Referring to FIGS. 7a-b, exemplary power circuits for use in the exemplary free-standing heating and cooling system 100 are shown. In embodiment illustrated in FIG. 7a, 110 volt alternate current power sources 310 and 312 may provide power directly to the display unit 150 and heating and cooling unit 140, respectively. A five volt direct current adapter 320 may be used to couple the power source 310 to the control unit 200. One or more relay modules 325 may be used to couple the control unit 200 to the display unit 150 and the heating and cooling unit 140 in order to allow the control unit 200 to turn either unit 140 and 150 on or off. A similar circuit is shown in FIG. 7b, except 220 volt alternating current power sources 311 and 313 are used and a 220 volt to 110 volt converter 315 is used to couple the power source 311 to the control unit 200 and display unit 150.

Exemplary Input/Output Panels

Figure 8:
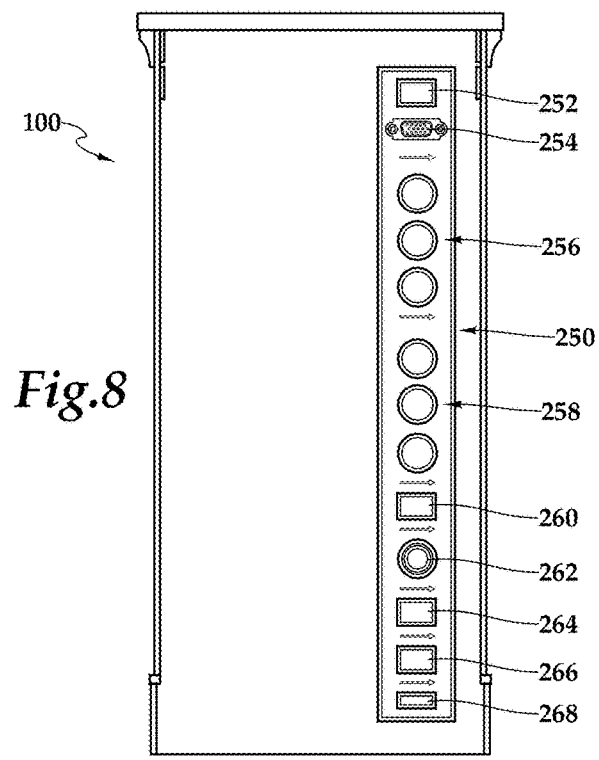
FIG. 8 shows an exemplary input/output panel for use in the exemplary free-standing heating and cooling system of FIG. 1.
Figure 9:
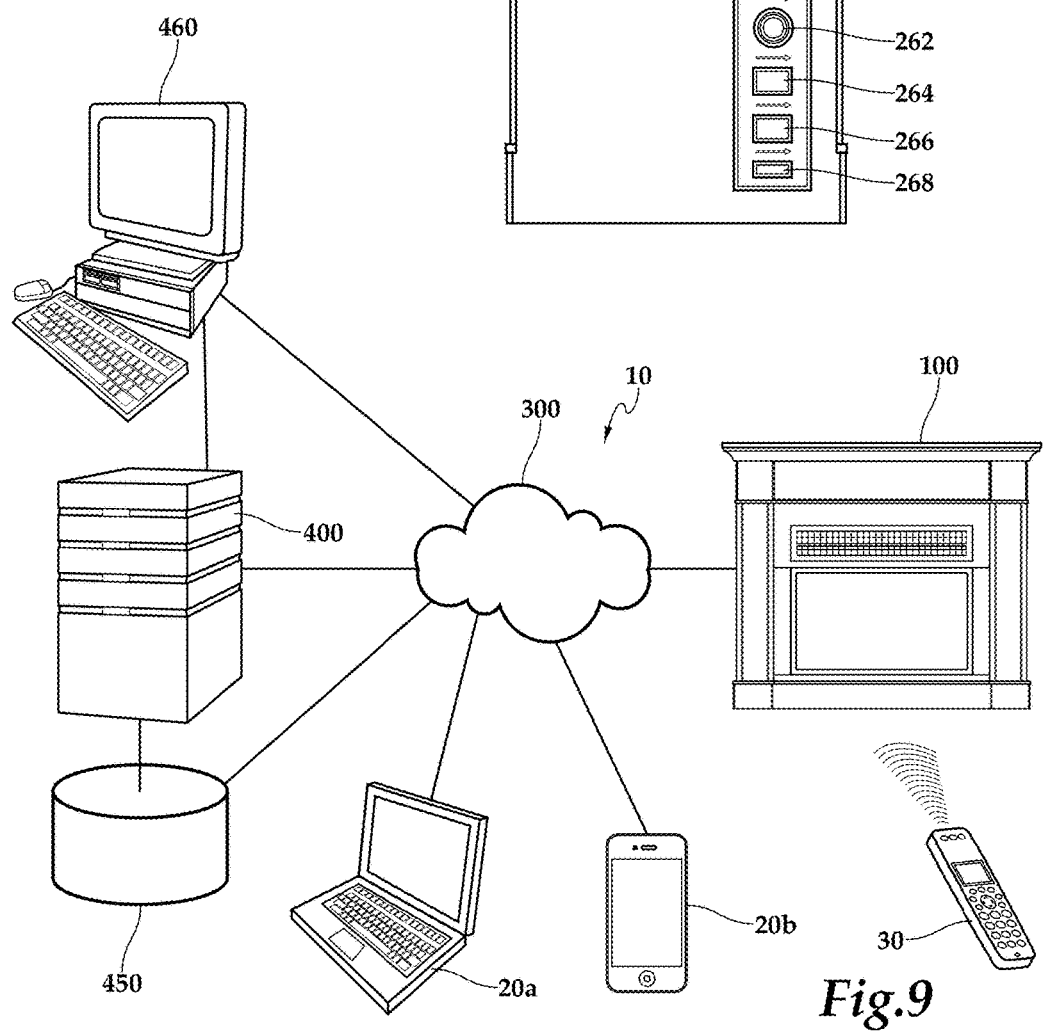
FIG. 9 shows an exemplary physical architecture for a system in which the exemplary free-standing heating and cooling system of FIG. 1 may interoperate with exemplary controller devices.

In some embodiments, the exemplary free-standing heating and cooling system 100 may include an input/output panel 250 that provides one or more input and/or output connectors coupled to the control unit 200, the display unit 140 or another component of the system 100. Referring to FIG. 8, an exemplary input/output panel 250 is shown. In the illustrated embodiment, the panel 250 may include power plugs 252 for providing power to the system 100, a VGA port 254 for receiving video signals from a computer or the like two sets of RCA jacks 256 and 258 for receiving video and audio signals, an HDMI plug 260 for receiving video and audio signals, a coaxial cable connector 262 for receiving video and audio signals, Ethernet ports 264 and 266 for connecting a network cable to the control unit 200 and display unit 150, respectively and a Universal Serial Bus (USB) port 268 for connecting USB-compliant devices to the control unit 200, the display unit 150, or both.

More or less connectors/ports may be provided. For example, a number of USB ports 268 may be provided to enable simultaneous charging of multiple USB-compliant devices, such as cell phones and tablet computers. In some embodiments, the input/output panel 250 provides connectors that mirror the input/output ports of the display unit 150, the controller 200, or both. Other types of input/output ports also may be provided on input/output panel 250.

Heating and Cooling System Operating Environment

Referring now to FIG. 10, an exemplary physical architecture for an environment in which the exemplary free-standing heating and cooling system 100 may interoperate with exemplary devices is shown. In the illustrated embodiment, the heating and cooling system 100 may communication with one or more client devices that may run client applications 20a-b, a remote control unit 30 and/or a heating and cooling management server 400 via a communications network 300 (shown as an exemplary Internet cloud).

The client applications 20a-b may communication directly with the heating and cooling system 100 (such as over a local network) or may communication with the heating and cooling system 100 indirectly through heating and cooling management server 400. In either case, the client applications 20a-b may provide control commands and/or request heating and cooling system 100 status and/or usage information. In response, the heating and cooling system 100 may receive the commands (directly or indirectly through server 400) and take a corresponding action. Similarly, historical usage information and the like may be provided by the heating and cooling management server 400. The server 400 may store this and other information in a database 450 and also may provide an administration interface 460 that enables an administrator to interact with the server 400.

Although references will now be made to specific components of the system performing specific features, it should be apparent to one of ordinary skill in the art that such references are exemplary and are not intended to limit the scope of the claims in any way; furthermore, the functionalities described herein may be implemented in a virtually unlimited number of configurations. For example, although figuratively attached to the heating and cooling management server 400, the database 450 may, in practice, distribute user-specific and/or product-specific data elements directly to one or more client applications 20a and 20b. Similarly, the heating and cooling management server 400 may be implemented as a single server configured to provide all of the system's functionalities, or the functionalities may be implemented across multiple servers.

The client applications 20a-b may provide a user interface for the system 100 and may communicate user profile and other information with the heating and cooling management server 400 via communications network 300. In one embodiment, client systems 20a-b may comprise stand-alone applications which may be either platform dependent or platform independent. For example, client systems 20a-b may be stand-alone applications for a mobile phone configured to run on a mobile operating system such as the iOS™ operating system from Apple Inc. located in Cupertino, Calif., the Android™ operating system from Google, Inc. located in Mountain View, Calif., or the like. Alternatively, or additionally, client systems 20a-b may connect to the server 400 via the Internet using a standard browser application. Alternatively, or additionally, one or more of the client systems 20a-b may be an application configured to run on a computer such as a desktop computer, a laptop computer, handheld computer, tablet, mobile messaging device, or the like which may all utilize different hardware and/or software packages. Other methods may be used to implement the client applications 20a-b.

The communications network 300 may be any type any private or public communication network, such as the Internet, and may include one or more communications networks. In some embodiments, the communications network 300 may be the Internet, a local area network or the like.

Exemplary Heating and Cooling Management Servers

The heating and cooling management server 400 may store user profile information, device profile and/or usage information and related information in a database 450, receive and/or provide this information and/or heating and cooling system 100 control commands from a client application 20*a-b*, communicate with various service providers (such as weather information providers), provide a user interface for an administration application 460, and the like. In operation, the heating and cooling management server 400 and client systems 20*a-b* may, for example, allow a user to register themselves and/or a heating and cooling system 100 with the heating and cooling management server 400, facilitate communications between a heating and cooling system 100 and a client application 20*a-b*, track and store usage data for a heating and cooling system 100, receive and facilitate processing of service requests and the like. As should be apparent to one of ordinary skill in the art from the disclosure herein, other related services may also be provided.

The database 450 may store a variety of information, including user profile information, device profile information, service related information, and the like. In some embodiments, all information stored in the database 450 is encrypted.

In some embodiments, the heating and cooling management server 400 and database 450 may comprise one or more instances of a GoDaddy™ Virtual Private Server (provided by GoDaddy Operating Company, LLC of Scottsdale, Ariz.) running the Windows Server 2012™ operating system (provided by Microsoft Corporation of Redmond, Wash.) utilizing one or more relational databases and/or other storage mechanisms.

In some embodiments, the system 10 may include an administration application 460. The administration application 460 may be provided by the heating and cooling management server 400 to, for example, as a stand-alone application running on a computer such as a workstation computer, laptop computer, handheld computer, tablet, mobile messaging device, or the like which may all utilize different hardware and/or software packages. Alternatively, or additionally, administration application 460 may connect to the heating and cooling management server 400 via the Internet using a standard browser application. A browser based implementation allows system features to be accessible regardless of the underlying platform of the administration application 460. Other methods may be used to implement the administration application 460. In operation, the administration application 460 may provide a framework that allows an administrator to evaluate and process submitted product service requests and the like. As should be apparent to one of ordinary skill in the art from the disclosure herein, other related services may also be provided.

An exemplary functional architecture 405 for a heating and cooling management server 400 is shown in FIG. 10. The architecture 405 may include application level functionality 410, back-end server functionality 420, and database functionality 440.

The application level functionality 410 may provide one or more user interfaces that implement the administration interface 460 and/or client interfaces 20*a-b* that allows an users and administrator to perform various functions, such as those described herein. Database functionality 230 provide mechanisms for storing and/or retrieving information from the database 450.

Back-end server functionality 420 may provide functions and control mechanisms for implementing the heating and cooling management server 400. In the illustrated embodiment, back-end server functionality 420 includes the following: user and product registration functionality 422 that enables a user to register themselves and/or a heating and cooling system 100 with the server 400; product control functionality 424 that enables a user to operate a heating and cooling system 100; product status and/or usage information 426 about a heating and cooling system 100; product service functionality 428 that enables a user to request service of a heating and cooling system 100 and/or enables an administrator to review and/or process a service request and the like.

The hyper-text transfer protocol (HTTP) server 430 may be used to interface the back-end functionality 420 with the application level functionality 410. In some embodiments, the HTTP server 430 may be an Apache HTTP Server (provided by the Apache Software Foundation), or any other suitable HTTP server. Other communications servers may be used. In operation, HTTP server 430 may receive requests and/or information such as user and/or product registration requests, control commands and/or submissions of requests for service of a heating and cooling system 100 from user clients 20*a-b*, processes the information and take appropriate actions in conjunction with the user registration functionality 422, product control functionality 424 and/or product service functionality 428, and provides responses to the user clients 20*a-b*. The HTTP server 430 also may receive status and/or usage information from and/or provide commands to a heating and cooling system 100 and process the information and/or take appropriate action in conjunction with the product control functionality 424 and product status/usage functionality 426. The HTTP server 430 also may receive requests and/or information from an administrator application 460, process the information and take appropriate action in conjunction with the product service functionality 428, and provide information and/or responses to the administrator application 460.

Alternatively, or additionally, an Application Programming Interface (API) may be provided to interface some or all of the back-end functionality 420 with the application level functionality 410.

Reviewing User Registration

The user and product registration functionality 422 may provide a framework for registering a user and/or a heating and cooling system 100 with the heating and cooling management server 400. FIG. 11 shows a flowchart for an exemplary user and/or product registration process 1100. A user may launch a client application (or app) 20*a* at step 1102. For example, the user may download a client application 20*a* from the APP STORE for mobile devices running the iOS operating system (both of which are provided by Apple, Inc. located in Cupertino, Calif.) or from the GOOGLE PLAY STORE for devices running the Android operating system (both of which are provided by Google, Inc. located in Mountain View, Calif.) and run the application 20*a* on their corresponding device. Alternatively, or additionally, the user may launch a client application 20*b* through a standard web browser.

Next, the user may enter user and/or product registration information at step 1104. The user may enter registration information including, for example, a first name, a last name, a zip code, a date of birth, an email address, a password (which may need to be entered twice for confirmation purposes), a product serial number and an authentication question. More or less information may be included and/or required. In some embodiments, the user may be required to agree to certain provisions, such as a Terms of Service and/or Privacy Policy 916. Once the information is complete, the user may submit the registration information to the heating and cooling management server 400 at step 1106.

In response to receiving user registration information, the heating and cooling management server 400 may send a user registration code to the user at step 1108. For example, the user registration code may be sent via an email to an email address included in the user registration information. Alternatively, or additionally, the device registration code may be sent by the heating and cooling management server 400 as a text message or other methods. The client application 20*a* may provide a user registration screen that provides user interface controls that enable the user to enter the user registration code at step 1110. The user may enter the code at step 1112 and the client application 20*a* may transmit the user registration code to the heating and cooling management server 400. In response, the server 400 may validate the code and register the user and/or product at step 1114.

Figure 12:
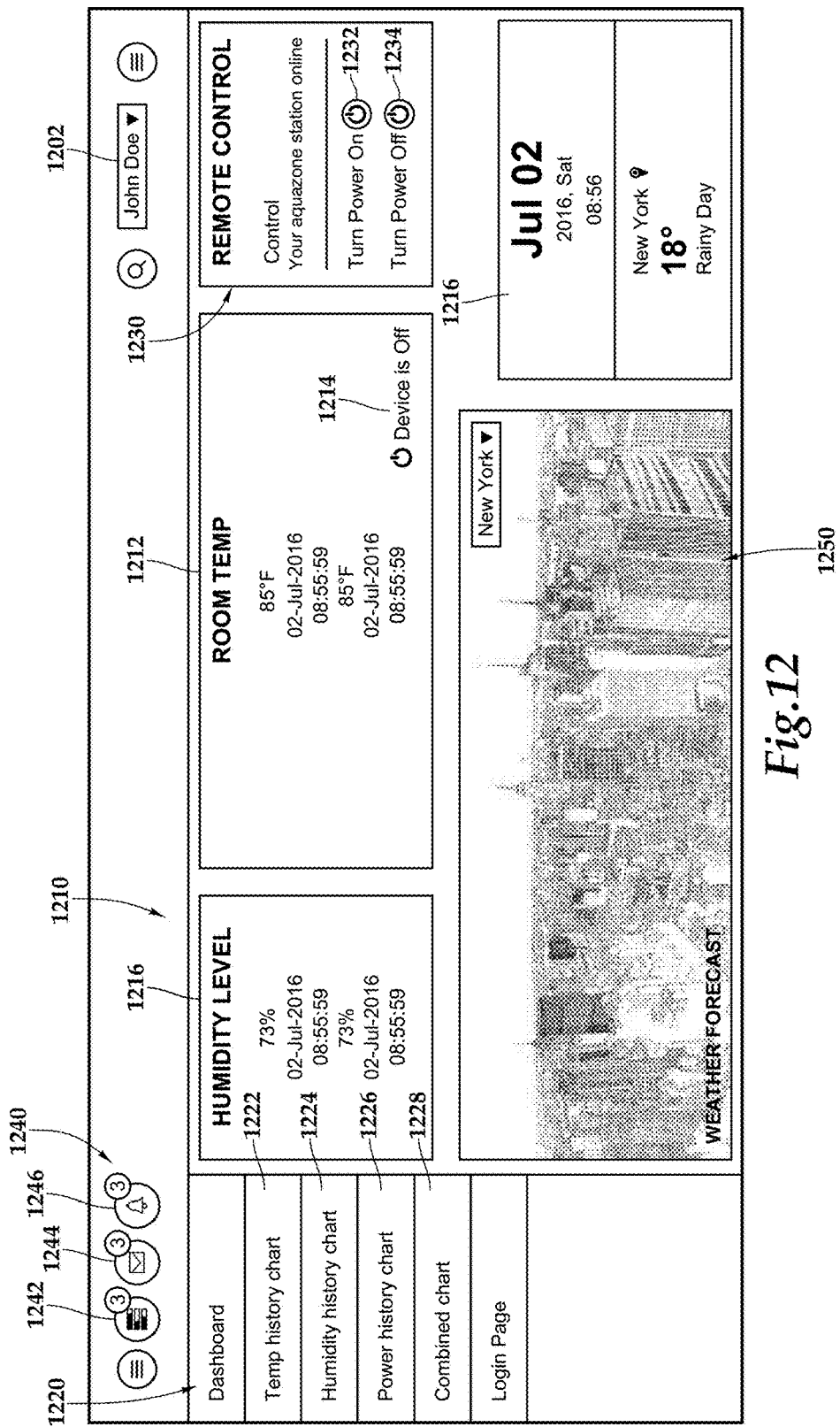
FIG. 12 shows an exemplary screen shot of a product portal page for use with the exemplary free-standing heating and cooling system of FIG. 1

Once registered, a user may log into the system 10 via a client application 20*a-b*. In some embodiments, upon logging in, a user may be presented with a variety of ways to access the functionality of the server 400. For example, a screen shot of a user dashboard 1200 is shown in FIG. 12. The user may select to view and/or edit their profile settings via control 1202, view current status information 1210, review historical usage information 1220, control a heating and cooling system 100 via controls 1230 (such as a power on control 1232 and a power off control 1234, view system information 1240 or view weather information 1250.

The user profile may include information about the user and/or any registered systems 100 associated with the user. For example, the user profile information may include a first name, last name, zip code, city, state and country information, email address, phone number, a password and/or one or more associated heating and cooling systems 100. Additional information also may be included in the user profile.

The current status information 1210 may indicate current status information for a heating and cooling system 100. For example, this may include the room temperature 1212 of the room in which the unit 100 is located, a humidity level for the in which the unit 100 is located, a current date and/or time, and device 100 status information, such as a mode of operation and/or other current settings of the device 100.

The historical usage information 1220 may various usage statistics for a device, such as previous settings of a device 100, average temperature settings and/or measured temperature values 1222, average humidity settings and/or measured humidity values 1224, electricity usage statistics 1226, combined charts 1228 that include one or more of temperature, humidity and electricity usage information, and the like. Other information, such as information about an outstanding or historic service requests, also may be included. The general system information may include notifications 1242 (such as service requests, notices of activity (such as turning the system 100 on or off, and the like), messages 1244 (such as promotional offers and the like) and alerts 1246 (such as service warnings, system updates and the like).

Controlling a Heating and Cooling System 100

As noted above, a heating and cooling system 100 may be controlled by a remote control unit 30 and/or by a client application 20*a*, either directly or through the control unit 200 and/or the heating and cooling management server 400. For example, in some embodiments, the remote control 30 may transmit wireless radio wave signals to the control unit 200, which in turn may transmit a corresponding command to the heating and cooling unit 140 over a wireless (such as an infrared blaster or the like) or wired (such as a direct relay connection or the like) communication link and/or to the display unit 150 (via similar mechanisms).

In some embodiments, all controls may be provided across all of the control methods, such as the remote control 30 and the client applications 20*a-b*. In other embodiments, some controls may be accessible only through a particular control method. In some embodiments, the remote control 30 and/or client application 20*a-b* may provide any or all of the functions provided by a manufacturer's remote control for the heating and cooling unit 140, the display unit 150, or both. More or less control options may be provided.

The remote control 30 may include a variety of technologies, such as a touchscreen, dedicated or programmable buttons, selector switches and the like. Referring to FIG. 13, an exemplary physical architecture for an exemplary remote control unit 30 for use in the exemplary free-standing heating and cooling system 100 is shown. Although selected aspects, features, or components of the implementations are depicted as being stored in memories, all or part of systems and methods consistent with the disclosed architecture may be stored on, distributed across, or read from other machine-readable media, for example, secondary storage devices such as hard disks, floppy disks, and CD-ROMs; a signal received from a network; other forms of ROM or RAM either currently known or later developed; and the like.

Furthermore, although specific components of the remote control unit 30 architecture will be described, methods, systems, and articles of manufacture consistent with disclosed architecture may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways, including unstructured data. Programs may be parts of a single program, separate programs, or distributed across several memories and processors. Systems may be implemented in hardware, software, or a combination of hardware and software in one processing system or distributed across multiple processing systems. For example, various functionalities of the remote control unit 30 may be integrated into the control unit 200, the heating and cooling unit 140, the display unit 150, or any combination thereof.

In the illustrated embodiment, the remote control unit 30 may include a microcontroller 350 coupled to a temperature/humidity sensor 352, a thin-film transistor (TFT) shield and TFT screen 354, and a wireless transceiver serial UART 356. Optionally, additional non-transient memory 351, such as flash memory and the like, may be provided. The remote control unit 30 also may include other components.

The microcontroller 350 may provide processing capabilities and/or transient and/or non-transient memory for enabling the functionalities of the remote control unit 30 as described herein. In some embodiments, microcontroller 210 may be an ARDUINO board or module provided by Arduino LLC, such as the ARDUINO UNO or ARDUINO MEGA. Other microcontrollers, such as the RASBERRY PI microcontroller provided by the Raspberry Pi Foundation of Cambridge, England, also may be used.

The temperature/humidity sensor 352 may monitor the current temperature and/or humidity of the room in which the remote control unit 30 is located. An exemplary temperature/humidity sensor is the ARDUINO DHT22/AM2302 provided by Arduino LLC.

The TFT shield 354 may provide functionality to the control a TFT touchscreen display unit that acts to provide interface controls, receive input from a user, display status and other information and the like. In some embodiments, the TFT shield 354 may be an TFT 2.4 shield for Arduino Mega or Uno with SPFD5408 Controller provided by Shenzhen Science and Technology Dewo Luopu Ltd. of Guangdong Province, China.

The wireless transceiver serial UART 356 may enable communication between the remote control unit and the control unit 200, the heating and cooling unit 140, the and/or the display unit 150. The communication may be unilateral or bi-lateral. For example, the remote control 30 may communicate command signals to the control unit 200 via the wireless transceiver 220, and the control unit 200 may, in turn, communicate commands to the heating and cooling unit 140 to, for example, turn on or off. In some embodiments, the relay modules 218 may comprise a C1101 wireless transceiver provided by Arduino LLC.

Figure 14A:
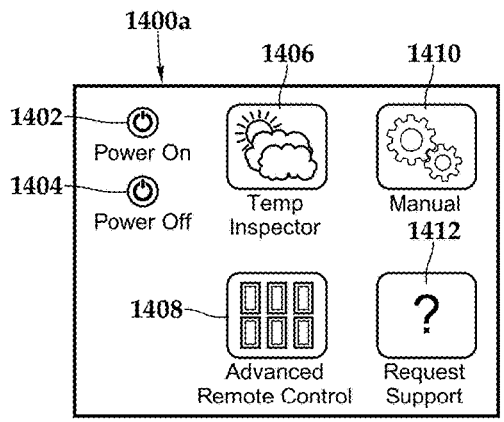
FIGS. 14a-14e show exemplary screen shots of an exemplary remote control unit for use with the exemplary free-standing heating and cooling system of FIG. 1.
Figure 14B:
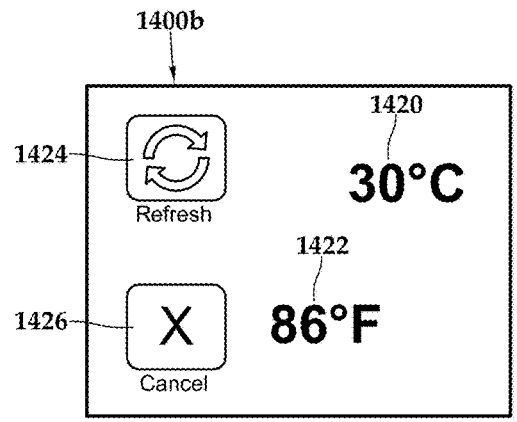

Referring to FIGS. 14a-e, exemplary screen shots of a remote control device 30 are shown. FIG. 14a shows a main menu control screen 1400a having various interface elements that allow user to operate a heating and cooling system 100. In the illustrated embodiment, the main control screen 1400a may include interface elements 1402 and 1404 for turning the system 100 on and off, respectively. Elements 1406 and 1408 also may be provided to allow a user to view current temperature information and for advanced control, respectively. For example, in response to a user selection of element 1406, a temperature inspection screen 1400b (shown in FIG. 14b) may be displayed. The temperature inspection screen 1400b may display the current temperature of the room as measured by the temperature/humidity sensor 352 in the remote control 30 in both Celsius 1420 and Fahrenheit 1422. A user may refresh/reacquire temperature readings or may return to the main menu by selecting the corresponding interface elements 1424 and 1426, respectively.

Figure 14C:
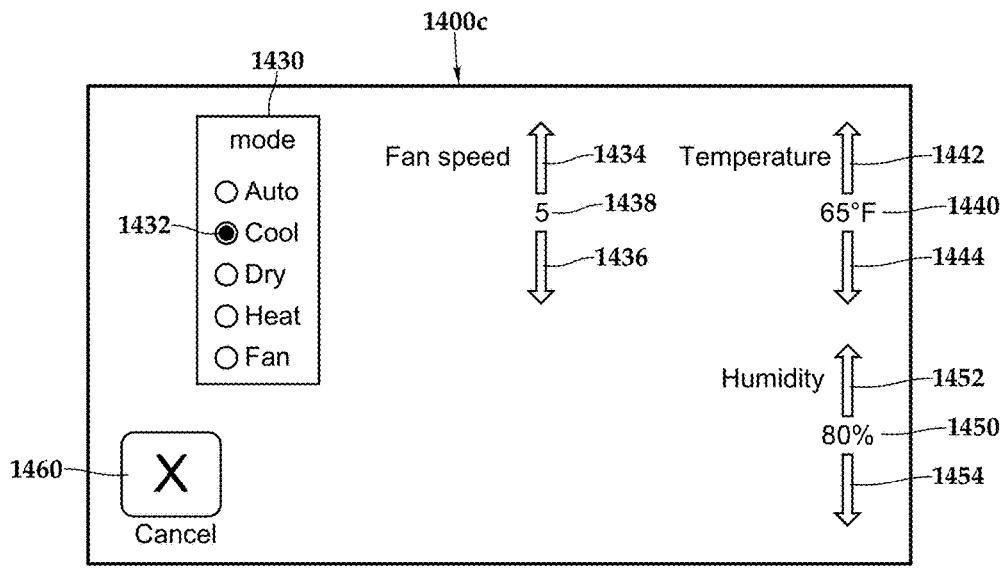
Figure 14D:
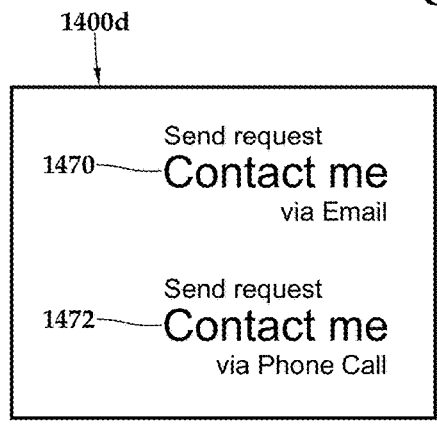
Figure 14E:
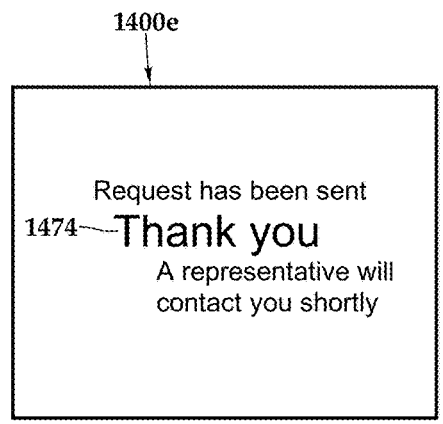

Upon selection of the advanced control element 1408 from the main menu, an advanced control screen 1400c may be displayed. The advanced control screen 1400c may include various interface elements to enable a user to control the heating and cooling unit 140, the display unit 150 and/or the control unit 200. An exemplary advanced control screen 1400c is shown in FIG. 14c. In the illustrated embodiment, the advanced control screen 1400c includes interface elements that allow a user to control the heating and cooling system 140 via the control unit 200. The advanced control screen 1400c may include a mode selector 1430 that may allow a user to select between various modes of operation for the heating and cooling unit 140, such as an auto cool mode, a dry mode, a heat mode, and a fan mode. Indicia 1432 may be provided to indicate the currently selected mode. Fan speed controls 1434 and 1436, temperature controls 1442 and 1444 and humidity controls 1452 and 1454 may be provided to allow a user respectively to raise or lower the fan speed, temperature and/or humidity setting(s) of the heating and cooling unit 140. The user may return to the main menu 1400a by selecting the corresponding interface element 1460.

Product service controls also may be provided via the main menu 1400a. In the embodiment illustrated in FIG. 14a, a user may select to view a product manual, such as a user manual or service manual by selecting interface element 1410. In addition, a user may request technical support by selecting element 1412.

A flow chart for an exemplary process for receiving and processing product support requests for an exemplary freestanding heating and cooling system 100 is shown in FIG. 15. A user may select a support interface element at step 1502, such as element 1412 shown in FIG. 14a. In response, the user may be prompted to indicate a preferred contact method, such as email, text message or the like. For example, a request selection screen 1400d may be shown. In the illustrated embodiment, selection of interface elements 1470 and 1472 may cause a support request to be transmitted to the heating and cooling management server 400 indicating a communication preference of either email contact or phone contact, respectively, at step 1506. Optionally, the user may be informed that the request was submitted via a confirmation screen, such as confirmation screen 1400e shown in FIG. 14e.

Next, the heating and cooling management server 400 may generate a support event (also referred to as a support ticket) based on the request at step 1508. In some embodiment, step 1508 may include added the support event to a list of support events. An exemplary list of support tickets 1600 is shown in FIG. 16. The list 1600 may include, for each support ticket, a device serial number 1602, a creation date 1604 and time 1606, and the type of support requested 1508 (such as a communication preference). Other information, such as an assigned technical representative also may be included.

An administrator may access the list 1600 through the administrator interface 460 and may assign the ticket to a technician that may follow up with the requesting user via their preferred contact method at step 1510. The technician may continue to follow-up with the customer until the issue is resolved at step 1512. Once resolved, the ticket may be cleared from the list 1600 at step 1514.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for heating and cooling a space, comprising:
   a fireplace housing assembly including an air filter an inside of a building, wherein the building includes an opening for a tubular connection to an exterior of the building:
   a heating and cooling unit in the fireplace housing assembly for providing heating and cooling functions, the heating and cooling unit having a heating mode of operation in which a heating function is provided and a cooling mode of operation in which a cooling function is provided, the heating and cooling unit mounted at least partially inside the housing, the heating and cooling unit being a ductless heating and cooling unit, wherein the heating and cooling unit has a dry mode to dehumidify the building in accordance with a humidity and temperature sensor;
   a sound unit and a display unit for rendering synchronized audiovisual content for heat or cool mode;
   a control unit coupled to the heating and cooling unit and the display unit, the control unit operative to cause an image or video associated with heat to be displayed on the display unit when the heating and cooling unit is in the heating mode of operation and to cause an image or video associated with coolness to be displayed on the display unit when the heating and cooling unit is in the cooling mode of operation; and a first software module for use on a server computer, the first software module including instructions stored on a non-transitory computer readable medium that transmit control signals over the Internet to the control unit to direct the operation of the heating and cooling unit.

2. The system of claim 1, where the housing assembly includes a side member having an aperture, the system further comprising: a bracket mounted in the aperture; and an air filter mounted in the filter bracket.

3. The system of claim 1, further comprising an input/output panel comprising a plurality of input/output connectors coupled to the control unit, the display unit, or both.

4. The system of claim 3, where the input/output connectors include connectors selected from the group comprising an HDMI connector, a coaxial connector and a USB connector.

5. The system of claim 1, where the housing assembly further includes a decorative facade.

6. The system of claim 5, where the housing assembly simulates the appearance of a fire place.

7. The system of claim 1, where the housing assembly includes a first unit comprising a top, two sides and a front, the housing assembly also including a second unit comprising a back and a base, the first unit comprising a first mounting member having a first shape and the second unit comprising a second mounting member having a second shape complimentary to the first shape, where the first mounting member engages the second mounting member to removably couple the first unit to the second unit to define the inside of the housing assembly.

8. The system of claim 7, where the first unit and the second unit are preassembled and the first unit is decoupled from the second unit by lifting.

9. The system of claim 1, comprising a first shape comprises a wedge and where a second complimentary shape is a wedge-shaped and where the complimentary second shape is a wedge-shaped cavity.

10. The system of claim 1 further comprising a remote control unit for controlling the operation of the heating and cooling unit, the remote control including a temperature sensor for measuring an ambient temperature of a room.

11. The system of claim 1, where the control unit includes a temperature sensor for measuring an ambient temperature of a room.

12. The system of claim 1, where control unit includes networking capabilities for communicating over the Internet.

13. The system of claim 1, where the first software module further includes instructions that receive current temperature information from the control unit.

14. The system of claim 13, where the first software module further includes instructions that store and track historical temperature information based on the temperature information received from the control unit.

15. The system of claim 1 further comprising a second software module for use on a client device selected from the group consisting of a computer and a mobile phone, the second software module including instructions stored on a non-transitory computer readable medium that:

transmit control signals for directing the operation of the heating and cooling unit to the server computer over the Internet; and where the first software module further includes instructions that:

receive the control signals from the second software module and, in response, transmit control signals over the Internet to the control unit to direct the operation of the heating and cooling unit.

* * * * *